INVENTOR
DAVID E. WILCOX 3,589,896
ELECTRO-OPTICAL ARTICLE EMPLOYING ELECTROCHROMIC AND PHOTOCONDUCTIVE MATERIALS
David E. Wilcox, Whitesboro, N.Y., assignor to the United States of America as represented by the Secretary of the Air Force
Filed May 27, 1968, Ser. No. 732,156
Int. Cl. G03g 5/08, 5/02
U.S. Cl. 96—1.5         1 Claim

ABSTRACT OF THE DISCLOSURE

The switching of electrochromic materials by means of electron beam or light beam excited sustained bombardment induced conductivity (SBIC) materials in which the electrochromic material becomes dark at those points addressed with the electron beam or beam of light. This electrochromic material can also be erased completely or selectively.

BACKGROUND OF THE INVENTION

This invention relates to electro-optical devices and more particularly to devices whose electromagnetic radiation transmission characteristics may be selectively controlled by the influence of an electric field.

Electrochromic substances are specific types of materials in which the optical transmission varies in the presence of a direct current potential. A layer of the material between two transparent conductive electrodes formed on the surface of a transparent substrate permits a darkening of the material when a direct current potential is applied to the two electrodes. The layer gets darker in proportion to the length of time the direct current potential is applied until a limiting optical density is achieved. The specific length of time required is dependent upon the material formulation and its physical configuration or thickness. The material is of a multistable nature and has an infinite number of stable states. When the direct current potential is removed, the electrochromic material remains in the darkened state of whatever optical density has been achieved. The material can be returned to the clear or transparent state when a direct current potential of the opposite polarity is applied across the two electrodes. Further, an electrochromic material can evidence a voltage threshold reaction in which there is no material state change unless the direct current potential level is above a certain value even though it is applied for a very long time.

Prior art indicates the possibility of adding to the electrode-electrochromic material sandwich, an additional layer, such as a photoconductive material between one of the electrodes and the electrochromic material. A photoconductive material is one wherein light intensity causes the electrical resistance of the material to vary. A photons from a light source are absorbed by the photoconductor, the conductivity of the material increases.

However, the application of a combination electrochromic-photoconductive material sandwich to computer generated display applications, where cathode ray tubes, electron beams or laser beams are used to form the image, is not feasible due to the requirement of circuit inertia or memory. This unfeasibility results from the fact that the image forming mechanism addresses each image element sequentially. In a typical computer generated display using a cathode ray tube to expose an electrochromic-photoconductor image film, it would be necessary to expose each element for several seconds to attain a sufficient darkening of the electrochromic material. This procedure is incompatible with the capabilities of the cathode ray tube and would require 500,000 to 1,000,000 seconds to form a typical display. For real time operation it is necessary to form or alter displays in a very few seconds at most. One problem that this invention solves is the adaptation of electrochromic materials to cathode ray tube or direct electron beam exposure to form a real time display device.

Other prior art devices have utilized sustained bombardment induced conductivity (SBIC) materials together with secondary emissive materials in a cathode ray tube for a computer generated display. However, these devices have not been satisfactory due to the excessively high fields required across the storage dielectrics normally used to form the image on the secondary emissive material on the face of the cathode ray tube. The fields must be of the order of $10^6$ volts per centimeter, thus it is necessary to use SBIC thin films in order to achieve the required potential needed with known emissive materials. However several disadvantages appear with the use of thin film SBIC materials. In the first place it is extremely difficult to produce sufficiently insulating continuous thin films. In addition, one immediate consequence with a film of silicon monoxide 1000 to 2000 angstroms thick is a five to tenfold increase in the capacity of the film which results in a significant decrease in writing and erase speeds. Also the maximum values of conduction available in such thin films are extremely small. These disadvantages appear to be characteristic of the high resistivity bombardment induced conductivity materials known heretofore such as silicon monoxide and magnesium fluoride.

A problem that this invention solves is the application of the SBIC technique to a low voltage light modulating material in order to obviate the need for a high voltage source to obtain a change of state in a light modulating material.

SUMMARY OF THE INVENTION

The electro-optical device of the present invention comprises an electrochromic material, a sustained bombardment induced conductivity (SBIC) layer, and two electrodes which are assembled in a sandwich arrangement. The problem of using an electrochromic material for use in a computer generated display is solved by the use of a layer of SBIC material. In turn, the problem of using SBIC material in a desirable, low voltage application is solved by the use of an electrochromic material.

The SBIC layer demonstrates properties somewhat similar to a photoconductor in that the conductivity increases in response to excitation. However, a SBIC layer is sensitive to electron beam excitation as well as optical, and its conductivity does not follow the excitation intensity waveform rather it integrates the excitation energy and stores a conductivity change proportional to that energy.

Thin films of processed cadmium sulfide have been developed which exhibit SBIC characteristics. The principal phenomenological characteristics of these layers can be summarized as follows:

(1) Pronounced rectification effects are observed when an electric field is applied without external excitation such as light or electron beam.

(2) When the direction of the applied field places the layer in the back biased or low current condition, external excitation produces a substantial increase in the conductance of the excited region. The amount of the increase depends on the integrated excitation energy.

(3) When the external excitation is removed, but the application of the field continues, the high conductivity state is substantially maintained in the previously excited region, thus exhibiting a bistable characteristic.

(4) Momentary reversal or removal of the field restores the excited region of the layer to its low conductance state.

(5) The conductance of the conductivity varying layer can be varied in two dimensions over long periods with no significant loss in the stored resolution.

(6) The conductance of the layers can be substantially increased by bombardment with microsecond pulses of high energy electron beams or light beams.

Since the sustained bombardment induced conductivity material responds to integrated power, the mechanism can be addressed by high power density levels for short times without the possibility of layer voltage breakdown. It would be possible to get a complete display in several seconds using an electrochromic layer in conjunction with the SBIC layer.

Thus, it is an object of this invention to provide an electro-optical device which can exhibit bistable transmission changes in response to electron beam or cathode ray tube optical excitation.

Another object of this invention is to provide an electro-optical device wherein it is possible to erase in such a manner that selected portions of the image can be altered without degrading or affecting other portions of the image.

A further object of this invention is to provide a simple electro-optical device which eliminates the need for regenerative display devices such as light valves with their complex data conversion needs, their high bandwidth operation and their image quality tradeoffs.

DESCRIPTION OF DRAWINGS

The novel features that are considered characteristic of this invention are set forth with particularlity in the appended claims. The invention itself, both as to its organization and method of operation, as well as additional objects and advantages thereof, will best be understood from the following description when read in connection with the accompanying drawings.

DESCRIPTION OF THE PREFERRED EMBODIMENT

Figure 1:
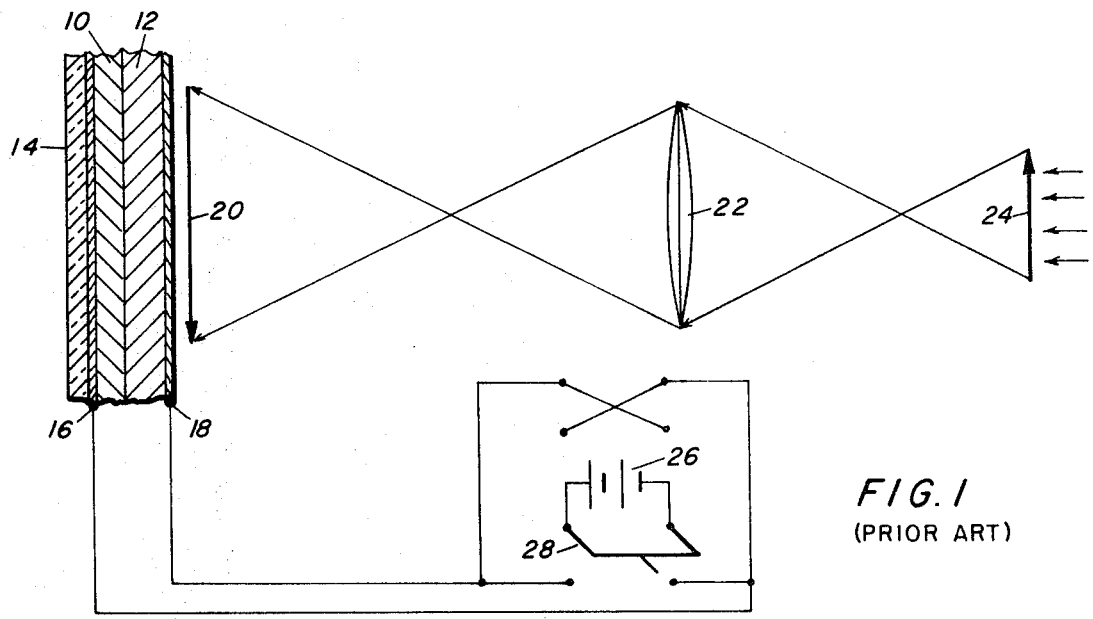
FIG. 1 is a prior art device.

Referring now to FIG. 1, a prior art electro-optical device which is both photosensitive and electrically sensitive is shown. On a substrate 14 such as glass or other transparent material, are successively deposited layers of a conductive material 16, an electrochemic material 10, a photoconductive material 12 and a second conductive material 18. The successive layers may be deposited on the transparent substrate 14 by known vacuum deposition techniques. A source of direct current potential 26 is coupled between the conductive materials via switch 28, but is of a magnitude such that the electric field is insufficient to initiate the darkening process in the absence of light excitation. Thus, there is formed a photographic image that relies on the increased conductivity of the photoconductive material due to the absorption by the photoconductor of photons from light excitation. In this mode of exposure all image elements are excited simultaneously, creating a density modulated image in the several seconds required for electrochromic activation.

Figure 2:
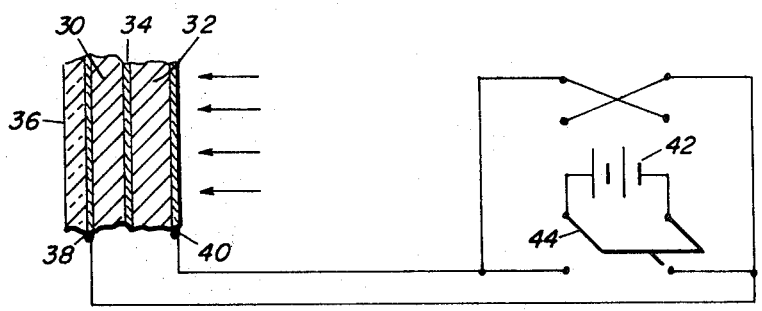
FIG. 2 is a view of the invention in its simplest form.

Referring now to FIG. 2, on a substrate 36 such as glass or other transparent material are successively deposited layers of a conductive material 38, an electrochromic material 30, a reflective layer 34, an SBIC layer 32, and a second conductive material 40. The substrate 36 and the conductive material 38 may conveniently be provided by "NESA" glass, a commercially available product having a coating of conductive tin oxide on one surface of a glass sheet. The successive layers may then be deposited on the tin oxide layer by known vacuum deposition techniques. The electrochromic layer 30 can be a material such as tungsten oxide or molybdenum oxide while the electrode 40 can be a material such as gold. The SBIC layer 32 can be a processed thin film of cadmium sulfide. A direct current potential 42 is applied via switch 44 to the electrodes 38 and 40, but is of a magnitude such that the electric field is insufficient to initiate the coloration process of electrochromic layer 30 in the absence of light or electron beam energy. The voltage distribution across the electrochromic-SBIC sandwich is determined by the impedance value of each layer but the fraction of the voltage impressed across the electrochromic layer 30 must be below the threshold level which would cause darkening. When SBIC layer 32 is excited by electron beam or light beam energy, its conductivity rapidly increases at the point of excitation and this increased level of conductivity is maintained after removal of the excitation. The increased conductivity of layer 32 at the point of excitation results in an increase in the potential impressed across the electrochromic layer 30. The increase in potential across layer 30 is sufficient to result in a total voltage greater than the activation threshold and darkening of the electrochromic material 30 begins. This darkening can take several seconds, but may be suitable for a real time display because other image elements are being activated and darkened simultaneously and it is not necessary to maintain the energization of an electron beam or light energy source. Once the proper optical density has been achieved, the potential is removed from across the layers 30 and 32, which erases the conductivity image in the SBIC layer 32 but leaves the optical image intact due to the optical density storage characteristic of the electrochromic layer 30.

To erase the optical image in layer 30, a D.C. potential 42 is applied with opposite polarity through switch 44 across the electrochromic layer 30. A negative voltage can be applied across the entire structure with the magnitude sufficient to place a negative D.C. voltage above the erase threshold across the electrochromic layer 30.

Selective erasure can be implemented with a non-polarity sensitive sustained conductive layer. Once the image is formed as described above, the multi-layer structure can be placed in the selective erase mode which is established by placing a negative voltage above the erase threshold across the electrochromic layer. Now, when the SBIC layer 32 is activated by electron beam or light beam energy at an image element, there is an increase in the magnitude of the negative voltage drop across the electrochromic layer sufficient to return it to the transparent state. Since the electrochromic layer 30 is multistable, either negative or positive images can be formed. Thus, to place the structure in the write, selective erase or complete erase mode requires the low speed switching of low level D.C. signals in contrast to the high level D.C. signals required for SBIC materials of other substance. Achieving a non-polarity sensitive induced conductivity layer requires placing a barrier region or reflective layer at both electrodes which means either erase or write will have somewhat lower resolution because penetration of the SBIC layer is required to activate the internal barrier region. Having erasure at a lower resolution than writing is generally compatible with most applications. The use of barrier region or reflective layer 34 is also to prevent the inadvertent activation of SBIC layer 32 by readout, stray, or ambient light.

Figure 3:
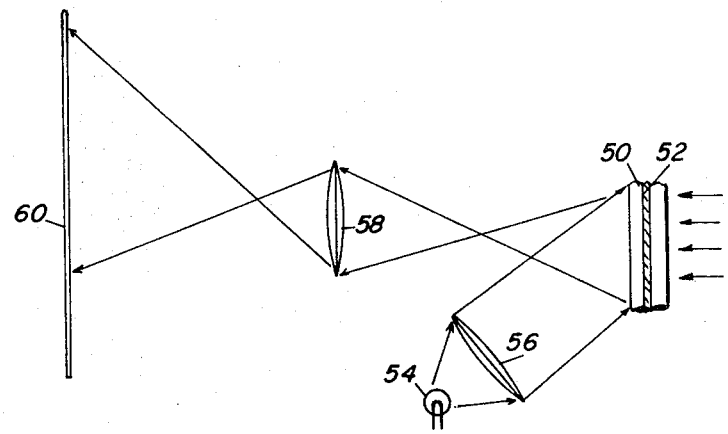
FIG. 3 is a view of the invention used as a read-out device.

Readout of the optical image can be facilitated by direct view of the electrochromic layer through the front glass or by projection in a reflective mode. As shown in FIG. 3, light rays from projection lamp 54 pass through a condensing lens 56 and the electrochromic layer 50 to a reflective barrier layer 52. This reflected light passes through projection lens 58 and is viewed on a screen 60. It is evident that the projection light from lamp 54 passes through the electrochromic layer 50 twice, therefore doubling the sensitivity of the system. Thus to achieve an effective optical density of 1.8 only requires that enough energy be supplied to the layer to achieve an optical density of 0.9 Since the electrochromic layer 50 is only several microns thick, there is a negligible effect on resolution. It is necessary to have a reflective barrier layer 52 so as to reflect light in the projection mode and also to prevent the light from further activating the SBIC layer 5 as described in FIG. 2.

It is evident that the usage described in FIG. 3 lends the electro-optical device to a projection type of display wherein the electrochromic-SBIC sandwich may be located in close proximity to the electron beam or light beam energy excitation source and the read-out screen is located according to the optical projection system used. This would lend the device to use in display systems, document storage and retrieval systems and management display systems.

Figure 4:
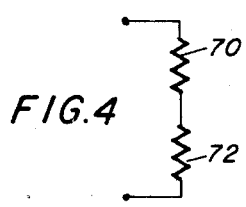
FIG. 4 shows the electrical equivalent of the present invention.

An example of an electrochromic layer and SBIC layer is shown in FIG. 4. The characteristics of SBIC material 70 would be voltage: 12 volts
current (OFF): 1 milliamp
current (ON): 7 milliamps
Z OFF: 12000 ohms per square centimeter
Z ON: 1700 ohms per square centimeter The impedance characteristic of the electrochromic material 72 is 400 ohms per square centimeter.

In the OFF condition the combined impedance characteristic would be 12,400 ohms per square centimeter. The combined current would be 0.97 milliamp per square centimeter. The resultant voltage across the electrochromic material 72 would be 0.39 volt which is below the threshold and darkening would not occur.

The combined impedance in the ON condition would be 2100 ohms per square centimeter. The combined current would be 5.7 milliamps per square centimeter. The voltage across the electrochromic material 72 would be 2.4 volts which is above the threshold level and darkening of the material would commence.

The foregoing is considered as illustrative only of the principles of the invention. Since numerous modifications will readily occur to persons skilled in the art, it is not desired to limit the invention to the exact construction and operation shown and described and accordingly all suitable modifications and equivalents are intended to fall within the scope of the invention claimed.

The following is claimed as new:

1. A variable light transmitting article comprising
 (a) a light-transparent substrate;
 (b) a first layer of electrically conductive material deposited on said substrate;
 (c) an electrochromic material deposited on said first layer;
 (d) a light-reflecting layer deposited on said electrochromic material for reflecting substantially in the direction of said substrate light received through said substrate;
 (e) a layer of cadmium sulfide characterized by sustained bombardment induced conductivity deposited on said light-reflecting layer whereby light activating said cadmium sulfide from the side thereof opposite to said light-reflecting layer produces conductivity changes therein whereas light activating said light-reflecting layer through said substrate is prevented from causing the occurrence of conductivity changes in said cadmium sulfide;
 (f) a second layer of electrically conductive material deposited on said cadmium sulfide; and
 (g) variable voltage means connected to said first and second layers of conductive material for reversibly applying an electric field to said electrochromic material.

References Cited
UNITED STATES PATENTS

| | | | |
|---|---|---|---|
| 3,316,088 | 4/1967 | Schaffent | 96—1.5 |
| 3,317,266 | 2/1967 | Heller | 350—160 |
| 3,334,229 | 8/1967 | Makeno | 250—65 |
| 3,355,290 | 11/1967 | Robillard | 96—1.5 |
| 3,403,387 | 9/1968 | Boblett | 340—173 |
| 3,444,530 | 5/1969 | Majima | 340—173 |
| 3,455,683 | 7/1969 | Le Her | 96—1 |
| 3,458,700 | 7/1969 | Kohashi | 250—71 |

GEORGE F. LESMES, Primary Examiner

J. C. COOPER III, Assistant Examiner

U.S. Cl. X.R.

96—1; 340—173; 350—160; 250—213; 346—74; 252—300, 501